US012576885B2

(12) United States Patent
Ayoubi et al.

(10) Patent No.: US 12,576,885 B2
(45) Date of Patent: Mar. 17, 2026

(54) AUTONOMOUS VEHICLE CONTROL

(71) Applicant: Nokia Technologies Oy, Espoo (FI)

(72) Inventors: Sara Ayoubi, Massy (FR); Ilija Hadzic, Murray Hill, NJ (US); Lou Salaun, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 208 days.

(21) Appl. No.: 18/351,203

(22) Filed: Jul. 12, 2023

(65) Prior Publication Data

US 2024/0067217 A1 Feb. 29, 2024

(30) Foreign Application Priority Data

Aug. 29, 2022 (EP) ..................................... 22192559

(51) Int. Cl.
| | |
|---|---|
| *B60W 60/00* | (2020.01) |
| *B60W 30/095* | (2012.01) |
| *H04L 67/12* | (2022.01) |

(52) U.S. Cl.
CPC ...... *B60W 60/0015* (2020.02); *B60W 30/095* (2013.01); *B60W 2520/00* (2013.01); *B60W 2554/80* (2020.02); *H04L 67/12* (2013.01)

(58) Field of Classification Search
CPC ............. B60W 60/00; B60W 60/0015; B60W 30/095; B60W 2520/00; B60W 2554/80; H04L 67/12
USPC .......................................................... 701/26
See application file for complete search history.

(56) References Cited

U.S. PATENT DOCUMENTS

| | | | | |
|---|---|---|---|---|
| 10,809,734 | B2 * | 10/2020 | De Castro ............ | G05D 1/0248 |
| 11,161,246 | B2 * | 11/2021 | Liu ........................ | B25J 9/1664 |
| 11,882,023 | B2 * | 1/2024 | Drusinsky ............. | H04L 45/123 |
| 12,124,261 | B2 * | 10/2024 | Li .......................... | G05D 1/227 |
| 2019/0094866 | A1 | 3/2019 | Moore et al. | |
| 2020/0293049 | A1 | 9/2020 | De Castro | |

(Continued)

FOREIGN PATENT DOCUMENTS

| | | |
|---|---|---|
| WO | 2022/120116 A2 | 6/2022 |
| WO | WO-2023196240 A1 * | 10/2023 ............ B25J 9/1682 |

OTHER PUBLICATIONS

Lu et al., "Layered costmaps for context-sensitive navigation", IEEE/RSJ International Conference on Intelligent Robots and Systems, Sep. 14-18, 2014, pp. 709-715.

(Continued)

*Primary Examiner* — Andrew Joseph Rudy
(74) *Attorney, Agent, or Firm* — ALSTON & BIRD LLP

(57) ABSTRACT

A computer apparatus, that receive, at an autonomous vehicle, information at least indicative of at least a velocity, a position and at least a portion of a current trajectory of at least one other autonomous vehicle; determine if a collision between the autonomous vehicle and at least one of the at least one other autonomous vehicle will occur, based, at least in part, on the received information and, at least, a velocity, a position and at least a portion of a current trajectory of the autonomous vehicle; and if it is determined that the collision will occur, amend a costmap of the autonomous vehicle based, at least in part, on relative positioning and/or trajectories of the autonomous vehicle and the at least one other autonomous vehicle to manipulate cost in the costmap in and/or around an area of a predicted collision zone.

20 Claims, 5 Drawing Sheets

(56) References Cited

U.S. PATENT DOCUMENTS

| | | | | |
|---|---|---|---|---|
| 2023/0051486 A1* | 2/2023 | Huang | .............. | B60W 60/0015 |
| 2023/0316912 A1* | 10/2023 | Ramamurthy | ......... | G08G 1/052 |
| | | | | 701/119 |

OTHER PUBLICATIONS

Ma et al., "Overview: A hierarchical framework for plan generation and execution in multirobot systems", IEEE Intelligent Systems, vol. 32, No. 6, Nov./Dec. 2017, pp. 6-12.

Sharon et al., "Conflict-based search for optimal multi-agent path-finding", Artificial Intelligence, vol. 219, Feb. 2015, pp. 40-66.

Phillips et al., "Sipp: Safe interval path planning for dynamic environments", IEEE International Conference on Robotics and Automation, May 9-13, 2011, pp. 5628-5635.

Long et al., "Towards optimally decentralized multi-robot collision avoidance via deep reinforcement learning", IEEE International Conference on Robotics and Automation (ICRA), May 21-25, 2018, pp. 6252-6259.

Den Berg et al., "Optimal reciprocal collision avoidance for multi-agent navigation", Proc. of the IEEE International Conference on Robotics and Automation, 2010, 8 pages.

Den Berg et al., "Reciprocal velocity obstacles for real-time multi-agent navigation", IEEE International Conference on Robotics and Automation, May 19-23, 2008, pp. 1928-1935.

Fiorini et al., "Motion planning in dynamic environments using velocity obstacles", The International Journal of Robotics Research, vol. 17, No. 7, pp. 760-772.

Wang et al., "Walk, stop, count, and swap: decentralized multi-agent path finding with theoretical guarantees", IEEE Robotics and Automation Letters, vol. 5, No. 2, Apr. 2020, pp. 1119-1126.

Snape et al., "Independent navigation of multiple mobile robots with hybrid reciprocal velocity obstacles", IEEE/RSJ International Conference on Intelligent Robots and Systems, Oct. 10-15, 2009, pp. 5917-5922.

Bishop, "Bayesian PCA", Advances in Neural Information Processing Systems, 1998, pp. 382-388.

Extended European Search Report received for corresponding European Patent Application No. 22192559.7, dated Jan. 9, 2023, 5 pages.

* cited by examiner

300

302

RECEIVING INFORMATION

304

DETERMINING IF COLLISION BETWEEN AUTONOMOUS VEHICLE AND AT LEAST ONE OF AT LEAST ONE OTHER AUTONOMOUS VEHICLE WILL OCCUR

306

IF IT IS DETERMINED THAT A COLLISION WILL OCCUR, AMENDING A COSTMAP OF THE AUTONOMOUS VEHICLE

40

42

46

48

50

44

A

B

AUTONOMOUS VEHICLE CONTROL

TECHNOLOGICAL FIELD

Examples of the disclosure relate to autonomous vehicle control. Some relate to autonomous ground vehicle control.

BACKGROUND

Some vehicles are configured to operate autonomously. For example, some vehicles are configured to navigate around an environment autonomously.

It would be desirable to improve or enhance autonomous vehicle operation.

BRIEF SUMMARY

According to various, but not necessarily all, embodiments there is provided an apparatus comprising means for performing:

receiving, at an autonomous vehicle, information at least indicative of at least a velocity, a position, and at least a portion of a current trajectory of at least one other autonomous vehicle;

determining if a collision between the autonomous vehicle and at least one of the at least one other autonomous vehicle will occur, based, at least in part, on the received information at least indicative of at least a velocity, a position, and at least a portion of a current trajectory of at least one other autonomous vehicle and, at least, a velocity, a position and at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to manipulate cost in the costmap in and/or around an area of a predicted collision zone.

In some examples, amending a costmap of the autonomous vehicle comprises amending a costmap of the autonomous vehicle based, at least in part, on relative positioning and/or trajectories of the autonomous vehicle and the at least one of the at least one other autonomous vehicle to cause the autonomous vehicle to travel towards a predetermined side of a determined collision zone.

In some examples, the means are configured to determine the velocity and position of the autonomous vehicle, based, at least in part, on sensor information.

In some examples, the means are configured to control transmission of information at least indicative of the velocity, the position and at least a portion of the current trajectory of the autonomous vehicle.

In some examples, determining if a collision between the autonomous vehicle and at least one of the at least one other autonomous vehicle will occur comprises determining a probability distribution for the position of the at least one other autonomous vehicle along the current trajectory of the at least one other autonomous vehicle as a function of time.

In some examples, determining if a collision between the autonomous vehicle and at least one of the at least one other autonomous vehicle will occur comprises determining a probability distribution for the position of the autonomous vehicle along the current trajectory of the autonomous vehicle as a function of time.

In some examples, determining a probability distribution comprises using a trained Markov-model.

In some examples, the means are configured to:

determine that a collision between the autonomous vehicle and the at least one of the at least one other autonomous vehicle will occur despite amending the costmap of the autonomous vehicle; and controlling movement of the autonomous vehicle to avoid the collision based, at least in part, on a predetermined priority order for the autonomous vehicle and the at least one of the at least one other autonomous vehicle.

In some examples, the means comprises at least one processor; and at least one memory including computer program code, the at least one memory storing instructions that, when executed by the at least one processor, cause performance of the apparatus.

According to various, but not necessarily all, embodiments there is provided a method comprising:

receiving, at an autonomous vehicle, information at least indicative of at least a velocity, a position and at least a portion of a current trajectory of at least one other autonomous vehicle;

determining if a collision between the autonomous vehicle and at least one of the at least one other autonomous vehicle will occur, based, at least in part, on the received information at least indicative of at least a velocity, a position, and at least a portion of a current trajectory of at least one other autonomous vehicle and, at least, a velocity, a position and at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to manipulate cost in the costmap in and/or around an area of a predicted collision zone.

In some examples, amending a costmap of the autonomous vehicle comprises amending a costmap of the autonomous vehicle based, at least in part, on relative positioning and/or trajectories of the autonomous vehicle and the at least one of the at least one other autonomous vehicle to cause the autonomous vehicle to travel towards a predetermined side of a determined collision zone.

In some examples, the method comprises controlling transmission of information at least indicative of the velocity, the position and at least a portion of the current trajectory of the autonomous vehicle.

In some examples, determining if a collision between the autonomous vehicle and at least one of the at least one other autonomous vehicle will occur comprises determining a probability distribution for the position of the at least one other autonomous vehicle along the current trajectory of the at least one other autonomous vehicle as a function of time.

According to various, but not necessarily all, embodiments there is provided a computer program comprising instructions which, when executed by an apparatus, cause the apparatus to perform at least the following:

receiving, at an autonomous vehicle, information at least indicative of at least a velocity, a position and at least a portion of a current trajectory of at least one other autonomous vehicle;

determining if a collision between the autonomous vehicle and at least one of the at least one other autonomous vehicle will occur, based, at least in part, on the received information and a velocity, a position and, at least, at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to inflate cost in the costmap in and/or around an area of a predicted collision zone.

In some examples, amending a costmap of the autonomous vehicle comprises amending a costmap of the autonomous vehicle based, at least in part, on relative positioning and/or trajectories of the autonomous vehicle and the at least one of the at least one other autonomous vehicle to cause the autonomous vehicle to travel towards a predetermined side of a determined collision zone.

According to various, but not necessarily all, embodiments there is provided a method comprising:

receiving, at an autonomous vehicle, information at least indicative of at least a velocity, a position, and at least a portion of a current trajectory of at least one other autonomous vehicle;

determining if a collision between the autonomous vehicle and at least one of the at least one other autonomous vehicle will occur, based, at least in part, on the received information at least indicative of at least a velocity, a position, and at least a portion of a current trajectory of at least one other autonomous vehicle and, at least, a velocity, a position, and at least a portion of a current trajectory of the autonomous vehicle; and if it is determined that a collision will occur, controlling movement of the autonomous vehicle to avoid the collision based, at least in part, on a predetermined priority order for the autonomous vehicle and the at least one other autonomous vehicle.

According to various, but not necessarily all, examples there is provided examples as claimed in the appended claims.

According to various, but not necessarily all, embodiments there is provided an apparatus comprising at least one processor; and at least one memory including computer program code;

the at least one memory storing instructions that, when executed by the at least one processor, cause the apparatus at least to perform at least a part of one or more methods disclosed herein.

According to various, but not necessarily all, embodiments there is provided an apparatus comprising means for performing at least part of one or more methods disclosed herein.

The description of a function should additionally be considered to also disclose any means suitable for performing that function.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
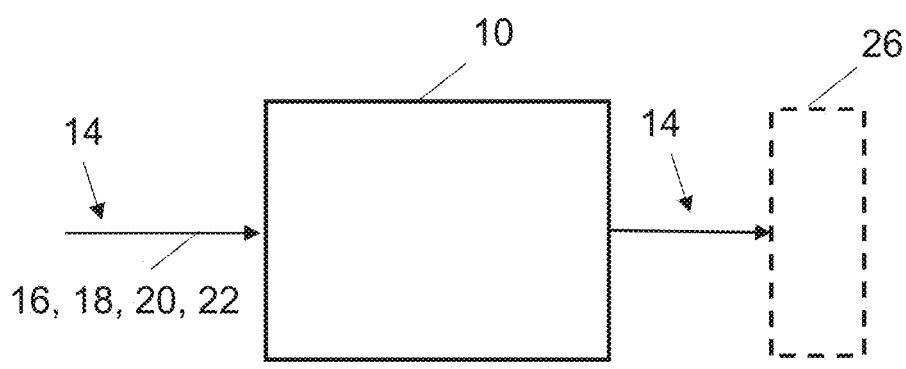
FIG. 1 shows an example of an apparatus.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

Examples of the disclosure relate to apparatus, methods, and/or computer programs for and/or involved in autonomous vehicle control.

Examples of the disclosure relate to apparatus, methods, and/or computer programs for and/or collision avoidance in autonomous vehicles.

Examples of the disclosure relate to apparatus, methods, and/or computer programs for and/or involved in predicting and avoiding a collision between autonomous vehicles.

The following description and FIGS. describe various examples of an apparatus 10 comprising means for performing:

receiving, at an autonomous vehicle 12, information 16 at least indicative of at least a velocity 18, a position 20, and at least a portion of a current trajectory 22 of at least one other autonomous vehicle 24;

determining if a collision between the autonomous vehicle 12 and at least one of the at least one other autonomous vehicle 24 will occur, based, at least in part, on the received information 16 at least indicative of at least a velocity 18, a position 20, and at least a portion of a current trajectory 22 of at least one other autonomous vehicle 24 and a velocity 19, a position 21 and at least a portion of a current trajectory 23 of the autonomous vehicle 12; and if it is determined that a collision will occur, amending a costmap 26 of the autonomous vehicle 12 based, at least in part, on relative positioning and/or trajectory of the autonomous vehicle 12 and the at least one of the at least one other autonomous vehicle 24 to manipulate cost in the costmap 26 in and/or around an area of a predicted collision zone 30.

The means can comprise at least one processor; and at least one memory including computer program code, the at least one memory storing instructions that, when executed by the at least one processor, cause performance of the apparatus.

As used herein, an apparatus and/or device and/or component for performing one or more actions should also be considered to disclose an apparatus and/or device and/or component configured to perform the one or more actions.

Similarly, as used herein, an apparatus and/or device and/or component configured to perform one or more actions should also be considered to disclose an apparatus and/or device and/or component for performing the one or more actions.

FIG. 1 schematically illustrates an example of an apparatus 10.

Various features referred to in relation to FIG. 1 can be found in the other FIGS.

In the example of FIG. 1 the apparatus 10 is configured to receive information 16 at least indicative of at least a velocity 18, a position 20, and at least a portion of a current trajectory 22 of at least one other autonomous vehicle 24.

Receiving information 16 can comprise receiving at least one signal and/or message 14.

The apparatus 10 can be comprised and/or integrated in a device or devices. The apparatus 10 can be comprised and/or integrated in any suitable device or devices.

For example, the apparatus 10 can be comprised and/or integrated in an autonomous vehicle 12. See, for example, FIG. 2.

For example, the apparatus 10 can be configured on a virtual machine in the cloud and can be configured to communicate with autonomous vehicle(s) 12 via appropriate interfaces.

The apparatus 10 can be considered a device and/or electronic device.

In examples, the apparatus 10 is configured to determine if a collision between the autonomous vehicle 12 and at least one of the at least one other autonomous vehicle 24 will occur, based, at least in part, on the received information 16 at least indicative of at least a velocity 18, a position 20, and at least a portion of a current trajectory 22 of at least one other autonomous vehicle 24 and a velocity 19, a position 21, and at least a portion of a current trajectory 23 of the autonomous vehicle 12.

The apparatus 10 can be configured to determine the velocity 19 and position 21 of the autonomous vehicle 12, based, at least in part, on sensor information 34.

The apparatus 10 can be configured to determine at least a portion of a current trajectory 22 of the autonomous vehicle 12.

In examples, the apparatus 10 is configured to control transmission of information 16 at least indicative of the velocity 19, the position 21, and at least a portion of the current trajectory 23 of the autonomous vehicle 12.

Determining if a collision between the autonomous vehicle 12 and at least one of the at least one other autonomous vehicle 24 will occur can comprise determining a probability distribution for the position of the at least one other autonomous vehicle 24 along the current trajectory 22 of the at least one other autonomous vehicle 24 as a function of time.

Determining if a collision between the autonomous vehicle 12 and at least one of the at least one other autonomous vehicle 24 will occur can comprise determining a probability distribution for the position of the autonomous vehicle along the current trajectory 22 of the autonomous vehicle 12 as a function of time.

Determining a probability distribution can comprise using a trained Markov-model.

In examples, the apparatus 10 is configured to, if it is determined that a collision will occur, amend a costmap 26 of the autonomous vehicle 12 based, at least in part, on relative positioning and/or trajectories of the autonomous vehicle 12 and the at least one of the at least one other autonomous vehicle 24 to manipulate cost in the costmap 26 in and/or around an area of a predicted collision zone 30.

Amending a costmap 26 of the autonomous vehicle 12 can comprise amending a costmap 26 of the autonomous vehicle 12 based, at least in part, on relative positioning and/or trajectories of the autonomous vehicle 12 and the at least one of the at least one other autonomous vehicle 24 to cause the autonomous vehicle 12 to travel towards a predetermined side 32 of a determined collision zone 30.

Amending a costmap 26 can comprise transmitting at least one signal 14 and/or message.

Amending a costmap 26 can comprise interacting with at least one application programming interface (API).

In examples, the apparatus 10 is configured to determine that a collision between the autonomous vehicle 12 and the at least one of the at least one other autonomous vehicle 24 will occur despite amending the costmap 26 of the autonomous vehicle 12; and to control movement of the autonomous vehicle 12 to avoid the collision based, at least in part, on a predetermined priority order for the autonomous vehicle 12 and the at least one of the at least one other autonomous vehicle 24.

In examples, the apparatus 10 can comprise any number of additional elements not illustrated in the example of FIG. 1.

Figure 2:
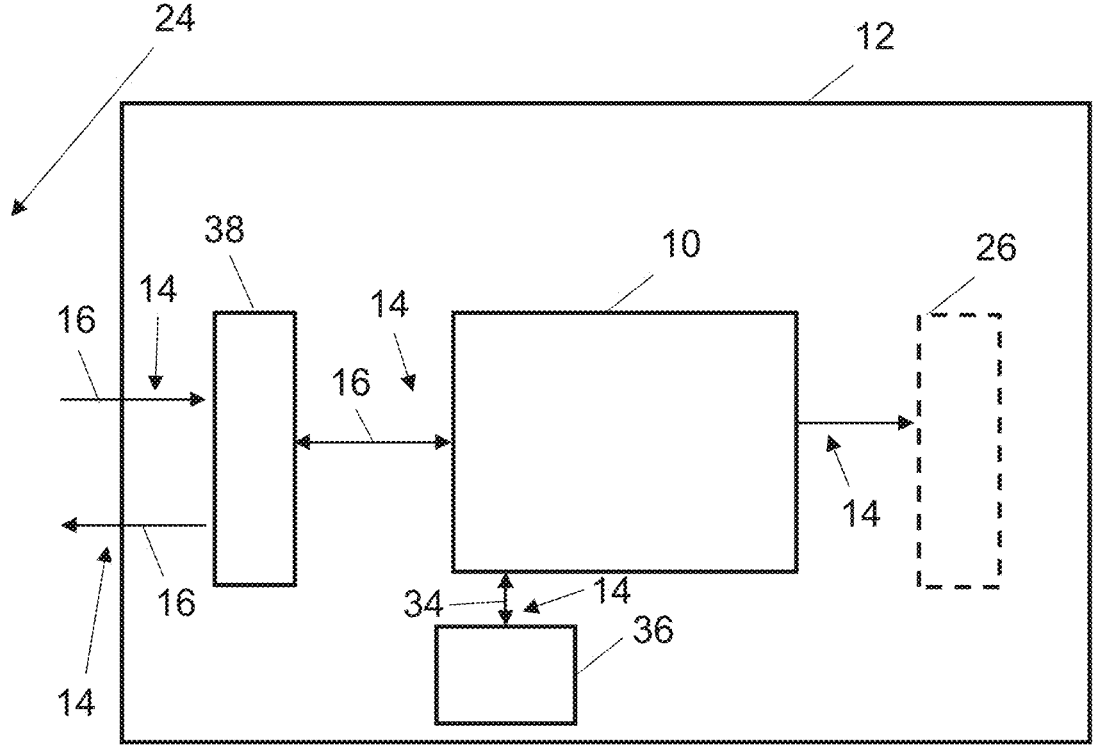
FIG. 2 shows an example of an autonomous vehicle.

FIG. 2 schematically illustrates an example of an autonomous vehicle 12.

The autonomous vehicle 12 can comprise any suitable autonomous vehicle 12. In some examples, the autonomous vehicle 12 is an autonomous ground vehicle.

According to various, but not necessarily all, examples of the disclosure an autonomous vehicle 12 can be considered a vehicle that can operate autonomously.

For example, an autonomous vehicle 12 can be considered a vehicle that, given at least one goal, can operate autonomously to achieve the at least one goal, without human input. The at least one goal can be provided by a human.

According to various, but not necessarily all, examples of the disclosure, an autonomous vehicle 12 can be considered a vehicle that can navigate autonomously through and/or around an environment.

For example, an autonomous vehicle 12 can be considered a vehicle that, given at least one goal, can navigate autonomously through and/or around an environment to the at least one goal and/or to achieve the at least one goal, without human input. The at least one goal can be provided by a human.

According to various, but not necessarily all, examples of the disclosure, an autonomous vehicle 12 can be considered a vehicle that is configured to sense its environment and operate autonomously.

For example, an autonomous vehicle 12 can be considered a vehicle that is configured, given at least one goal, to sense its environment and operate to achieve the at least one goal, without human input. The at least one goal can be provided by a human.

The autonomous vehicle 12 can be considered at least one of: an unmanned vehicle, a driverless vehicle, a robot, a drone and so on.

In the example of FIG. 2, the autonomous vehicle 12 comprises at least one transceiver 38, at least one sensor 36 and an apparatus 10 as described in relation to FIG. 1.

In some examples, the autonomous vehicle 12 can be considered an apparatus.

The at least one transceiver 38 can comprise any suitable transceiver 38 or transceivers 38. For example, the at least one transceiver 38 can comprise any suitable transceiver(s) 38 for transmitting and/or receiving at least one signal 14.

In examples, the at least one transceiver 38 is configured to transmit and/or receive at least one signal using wired and/or wireless communication. Any suitable wired and/or wireless communication protocol or protocols can be used. For example, Wi-Fi and/or Bluetooth, and/or cellular communication protocol(s) can be used.

In some examples, at least one separate transmitter and receiver can be used instead of or in addition to the at least one transceiver 38 In examples, the at least one transceiver 38 is configured to receive information 16 at least indicative of at least a velocity 18, a position 20, and at least a portion of a current trajectory 22 of at least one other autonomous vehicle 24.

In examples, the at least one transceiver 38 is configured to transmit information 16 at least indicative of a velocity 19, a position 21, and at least a portion of a current trajectory 23 of the autonomous vehicle 12.

The at least one sensor 36 can comprise any suitable sensor 36 or sensors 36.

For example, the at least one sensor 36 can comprise any suitable sensor 36 or sensors 36 configured to allow/enable, at least in part, the autonomous vehicle 12 to function/operate autonomously.

For example, the at least one sensor 36 can comprise any suitable sensor that can be used in determining a velocity 19 and/or a position 21 of the autonomous vehicle 12.

In examples, the at least one sensor 36 can comprise any suitable sensor 36 configured to provide sensor information 34 to the apparatus 10 to allow/enable the apparatus 10 to determine a velocity 19 and/or a position 21 of the autonomous vehicle 12.

For example, the at least one sensor 36 can comprise, at least one motion sensor, at least one inertial measurement unit, at least one lidar and so on. The at least one sensor can be used in performing odometry.

In examples, the at least one sensor 36 provides sensor information 34 to the apparatus 10, the apparatus 10 determines the velocity 19 and position 21 of the autonomous vehicle 12 and controls transmission of information 16 comprising the velocity 19, the position 21 and at least a portion of the current trajectory 23 of the autonomous vehicle 12 via the at least one transceiver 38.

In examples, the at least one transceiver 38 can be considered at least one sensor 36.

As discussed herein, the apparatus 10 is configured to amend, if a collision is predicted, the costmap 26 of the autonomous vehicle 12.

For the purposes of clarity, not all elements of the autonomous vehicle 12 are illustrated in the example of FIG. 2, and, in examples, the autonomous vehicle 12 can comprise any number of additional components Signal(s) 14 can be communicated between the different elements of the autonomous vehicle 12 and the apparatus 10 in the example of FIG. 2.

Accordingly, as illustrated in the example of FIG. 2, the at least one transceiver 38 and the at least one sensor 36 are operationally coupled to the apparatus 10 and any number of intervening elements can exist between them (including no intervening elements).

Additionally, or alternatively, one or more elements of the autonomous vehicle 12 illustrated in the example of FIG. 2 can be integrated or combined.

Figures 3, 4:
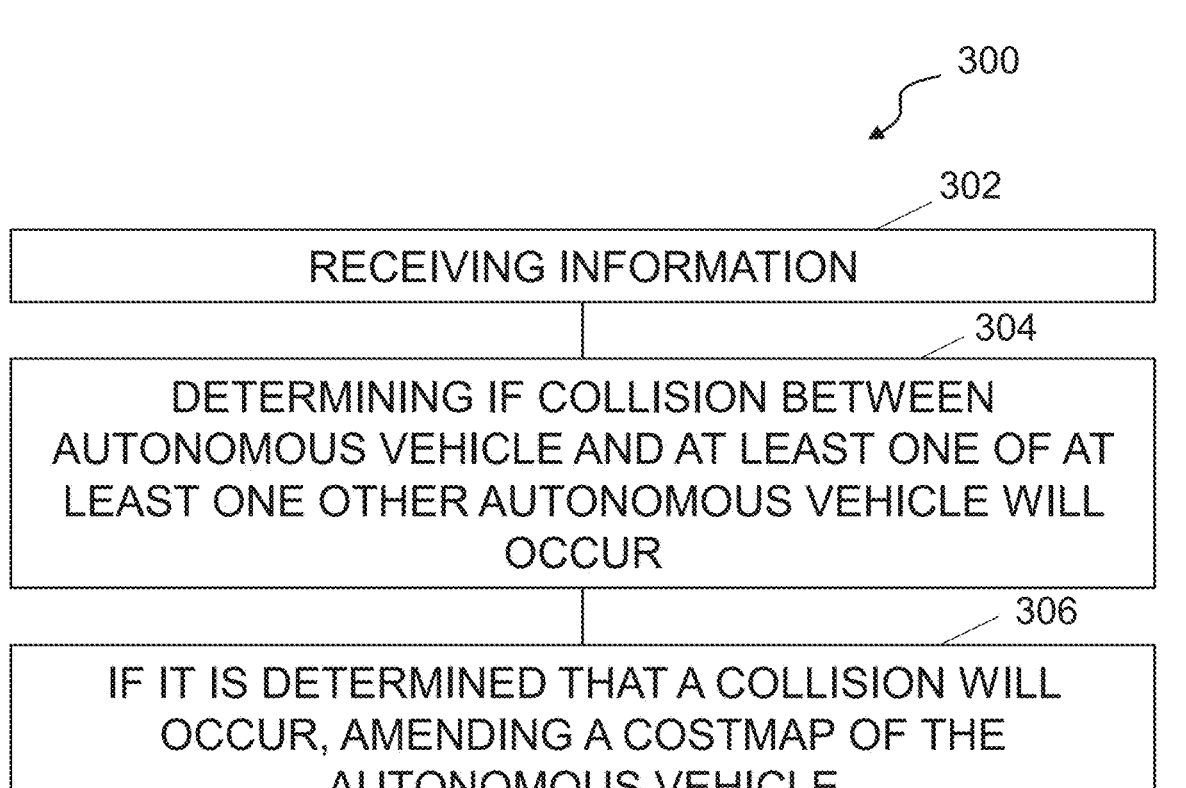
FIG. 3 shows an example of a method.
FIG. 4 shows an example plot.

FIG. 3 illustrates an example of a method 300.

One or more features discussed in relation to FIG. 3 can be found in one or more of the other FIGS.

In examples, method 300 can be considered a method of autonomous vehicle control.

In examples, method 300 can be considered a method of avoiding collisions in autonomous vehicles.

In examples, method 300 can be considered a method of predicting and avoiding a collision between autonomous vehicles.

Method 300 can be performed by any suitable apparatus comprising any suitable means for performing the method 300.

Figures 9A, 9B:
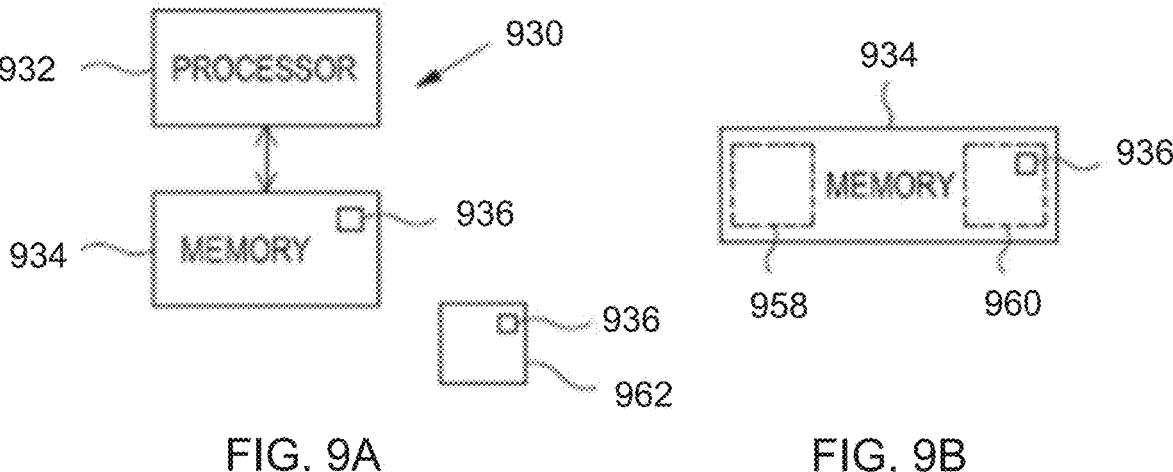
FIG. 9A shows an example of a controller.
FIG. 9B shows an example memory.

In examples, method 300 can be performed by the apparatus of FIGS. 9A and 9B and/or the apparatus 10 of FIG. 1 and/or the autonomous vehicle 12 of FIG. 2.

At block 302, method 300 comprises receiving, at an autonomous vehicle 12, information 16 at least indicative of at least a velocity 18, a position 20, and at least a portion of a current trajectory 22 of at least one other autonomous vehicle 24.

Block 302 can be performed in any suitable way using any suitable method.

In examples, receiving, at an autonomous vehicle 12, information 16 comprises receiving at least one signal 14 and/or message.

The information 16 can be received directly or indirectly from the at least one other autonomous vehicle 24. For example, each of the at least one other autonomous vehicle 24 can transmit the information 16 at least indicative of at least a velocity 18, a position 20, and at least a portion of a current trajectory 22 of the other autonomous vehicle 24.

In examples, each of the at least one other autonomous vehicle 24 broadcasts its information 16.

In some examples, the information 16 can be received from an entity that is separate from the at least one other autonomous vehicle 24.

Receiving the information 16 can comprise a low-bandwidth message exchange between the autonomous vehicle 12 and the at least one other autonomous vehicle 24.

The information 16 can be received, at the autonomous vehicle 12, according to any suitable timing and/or schedule. In some examples, the information 16 is transmitted/received periodically.

In examples, information 16 can be received from different ones of the at least one other autonomous vehicle 24 at different times.

The autonomous vehicle 12 can comprise any suitable autonomous vehicle 12. For example, the autonomous vehicle 12 can comprise an autonomous vehicle 12 as described in relation to FIG. 2.

In examples, the autonomous vehicle 12 is an autonomous ground vehicle. In examples, the autonomous vehicle 12 can be considered an unmanned vehicle.

The at least one other autonomous vehicle 24 can comprise any suitable autonomous vehicle 12. For example, the at least one other autonomous vehicle 24 can comprise an autonomous vehicle 12 as described in relation to FIG. 2.

In examples, the at least one other autonomous vehicle 24 comprises at least one other autonomous ground vehicle.

The at least one other autonomous vehicle 24 can be the same as or different to the autonomous vehicle 12.

In examples, from the point of view of the at least one other autonomous vehicle 24, the at least one other autonomous vehicle 24 can be considered the autonomous vehicle 12 and the autonomous vehicle 12 can be considered, at least part of, the at least one other autonomous vehicle 24.

Accordingly, there can be a plurality of autonomous vehicles 12 and from the point of view of each autonomous vehicle 12 the remaining autonomous vehicle(s) 12 can be considered the at least one other autonomous vehicle 24.

Accordingly, in examples, any of the plurality of autonomous vehicles 12 can be considered the autonomous vehicle 12 and, correspondingly, at least part of the at least one other autonomous vehicle 24.

Accordingly, in examples, any of the plurality of autonomous vehicles 12 can be configured to perform at least part of one or more methods described herein. For example, any of the plurality of autonomous vehicles 12 can be configured to perform method 300.

The information 16 at least indicative of at least a velocity 18, a position 20, and at least a portion of a current trajectory 22 of at least one other autonomous vehicle 24 can comprise any suitable information having any suitable form.

In some examples, the information 16 comprises the velocity 18, position 20, and/or at least a portion of the current trajectory 22 of at least one other autonomous vehicle 24.

In some examples, the information 16 comprises information that can be processed to determine the velocity 18, position 20, and/or at least a portion of the current trajectory 22 of at least one other autonomous vehicle 24.

The information 16 can comprise the estimated velocity 18, position 20 and at least portion of the current trajectory 22 of at least one other autonomous vehicle 24 when the estimation was made.

The at least a portion of the current trajectory 22 can be considered the intent and/or short-term intent of the at least one other autonomous vehicle 24.

The at least a portion of the current trajectory 22 can be considered the currently pursued segment of the trajectory 22.

In examples, the at least a portion of the current trajectory 22 is configured to allow other autonomous vehicles to know if, for example, an autonomous vehicle 12 aims to continue straight, take a left turn, take a right turn and so on.

In examples, the at least a portion of the current trajectory 22 is configured to allow other autonomous vehicles to know the motion vector of the autonomous vehicle. In examples, a motion vector can comprise a pair of linear and angular velocity or a pair of tangential velocity and turn radius.

The position of the at least one other autonomous vehicle 24 can be considered the pose of the at least one other autonomous vehicle 24.

At least part of the information 16 for the at least one other autonomous vehicle 24 can be determined from local sensor(s) on the at least one other autonomous vehicle 24.

Accordingly, in examples, each of the at least one other autonomous vehicle 24 determines its velocity 18, position 20, and at least a portion of its current trajectory 22 and broadcasts this information 16 to other autonomous vehicles 12, 24 in the vicinity.

At block 304, method 300 comprises determining if a collision between the autonomous vehicle 12 and at least one of the at least one other autonomous vehicle 24 will occur, based, at least in part, on the received information 16 at least indicative of at least a velocity 18, a position 20, and at least a portion of a current trajectory 22 of at least one other autonomous vehicle 24 and, at least, a velocity 19, a position 21, and at least a portion of a current trajectory 23 of the autonomous vehicle 12.

Block 304 can be performed in any suitable way using any suitable method.

In examples, determining if a collision between the autonomous vehicle 12 and at least one of the at least one other autonomous vehicle 24 will occur at block 304 comprises determining and/or estimating if the autonomous vehicle 12 and at least one of the at least one other autonomous vehicle 24 will be at an intersection of their respective trajectories at the same or similar time such that a collision will occur.

In examples, determining if a collision between the autonomous vehicle 12 and at least one of the at least one other autonomous vehicle 24 will occur at block 304 comprises determining an estimated position of the at least one of the at least one other autonomous vehicle 24 as a function of time and/or determining an estimated position of the autonomous vehicle 12 as a function of time.

The velocity 19, position 21, and at least a portion of the current trajectory 23 of the autonomous vehicle 12 can be determined in any suitable way using any suitable method.

In examples, information can be received and/or processed to determine the velocity 19, position 21, and at least a portion of the current trajectory 23 of the autonomous vehicle 12.

In examples, the at least a portion of a current trajectory of an autonomous vehicle 12 is received from a navigation stack of the autonomous vehicle 12.

In examples, a navigation stack comprises at least one component configured to perform at least one method to determine a trajectory from a first point/location (point/location A) to a second, different point (point/location B) using, for example, shortest-path algorithm with respect to the costmap 26.

Any suitable shortest-path algorithm or algorithms can be used. For example, any suitable algorithm or algorithms that finds the shortest path within the constraints imposed by, for example, the costmap 26 can be used. For example, A* algorithm and/or Dijkstra algorithm can be used.

In some examples, method 300 comprises determining the velocity 19 and position 21 of the autonomous vehicle 12, based, at least in part, on sensor information 34.

For example, sensor information 34 from one or more sensors 36 of the autonomous vehicle 12 can be used in determining the velocity 19 and position 21 of the autonomous vehicle 12. See, for example, FIG. 2.

In some examples, method 300 comprises controlling transmission of information 16 at least indicative of the velocity 19, the position 21, and at least a portion of the current trajectory 23 of the autonomous vehicle 12.

Accordingly, in examples, the autonomous vehicle 12 can transmit and/or broadcast its own information 16 to other autonomous vehicles 24, which can receive the information 16 as described in relation to block 302.

Accordingly, as previously discussed, the autonomous vehicle 12 can, from the point of view of other autonomous vehicle(s) behave as, at least part of, the at least one other autonomous vehicle 24.

In some examples, determining if a collision between the autonomous vehicle 12 and at least one of the at least one other autonomous vehicle 24 will occur comprises determining a probability distribution 52 for the position of the at least one other autonomous vehicle 24 along the current trajectory 22 of the at least one other autonomous vehicle 24 as a function of time.

In some examples, determining if a collision between the autonomous vehicle 12 and at least one of the at least one other autonomous vehicle 24 will occur comprises determining a probability distribution 52 for the position of the autonomous vehicle 12 along the current trajectory 22 of the autonomous vehicle 12 as a function of time.

Determining a probability distribution 52 for the position of an autonomous vehicle 12 (and therefore also at least one other autonomous vehicle 24) can be performed in any suitable way using any suitable method.

In examples determining a probability distribution 52 comprises using the velocity 18, 19, position 20, 21, and/or at least a portion of the current trajectory 22, 23 of the autonomous vehicle 12 and at least one other autonomous vehicle 24 in at least one model.

For example, the velocity 18, 19, position 20, 21 and/or at least a portion of the current trajectory 22, 23 can be used as inputs into at least one model.

In examples, any suitable model or models can be used. In some examples, a travel-time estimation model that allows prediction of when autonomous vehicles 12 will reach different waypoints along their trajectory 22, and hence predict future collisions, can be used.

In examples, the at least one model can comprise at least one trained model. For example, the at least one model can comprise at least one model that has been trained based, at least in part, on the circumstances in which the autonomous vehicles 12, 24 are operating and/or the characteristics and/or configuration of the autonomous vehicles 12, 24 and so on.

In some examples, determining a probability distribution comprises using a trained Markov-model.

A Markov-model can be used in any suitable way. In some examples, the information 16 of the velocity 18, 19 position 20, 21 and current trajectory 22, 23 of the autonomous vehicle 12 and at least one other autonomous vehicle 24 is passed to a Markov-model.

The Markov-model can be configured to output a conditional distribution of an autonomous vehicle's position as a function of time.

For example, the Markov-model can return an m×n matrix, where the columns represent waypoints along the current trajectory 22 and rows represent a timestep into the future. Hence, in such examples, each row represents the conditional distribution of an autonomous vehicle's position, given the timestep corresponding to that row.

By way of example, reference is made to the example of FIG. 4.

FIG. 4 shows an example plot.

In the example of FIG. 4, estimated position of an autonomous vehicle 12 after an amount of time is shown. In the example of FIG. 4, the estimated position of an autonomous vehicle 12 after four timesteps of one second is shown.

In the illustrated example, probability is indicated on the Y-axis 42 and position, in the form of waypoints along a trajectory 22, is indicated on the X-axis 44.

In the example of FIG. 4, the true position 40 of the autonomous vehicle 12 is indicated by a star for comparison.

In FIG. 4, line 48 represents the predicted position for the autonomous vehicle 12 at that time using a Markov model. The line 50 represents smoothed data from the Markov model.

It can be seen that the Markov model estimation corresponds well to the true position of the autonomous vehicle 12.

By way of comparison, line 46 represents a prediction based on average-velocity extrapolation. It can be seen that average velocity extrapolation does not, in the example of FIG. 4, represent the true position 40 of the autonomous vehicle 12 well.

Returning to the example of FIG. 3, in some examples, determining if a collision between the autonomous vehicle 12 and at least one of the at least one other autonomous vehicle 24 will occur comprises processing the determined probability distributions 52 for the positions of the autonomous vehicle 12 and the at least one other autonomous vehicle 24.

In examples, determining if a collision between the autonomous vehicle 12 and at least one of the at least one other autonomous vehicle 24 will occur comprises comparing the determined probability distributions 52 for the positions of the autonomous vehicle 12 and the at least one other autonomous vehicle 24 to determine if a collision will and/or is likely to occur.

For example, determined probability distributions 52 for the positions of the autonomous vehicle 12 and the at least one other autonomous vehicle 24 can be analyzed, and/or checked, and/or compared to determine if there is at least one time where the autonomous vehicles 12, 24 will attempt to cross the same point/area at the same and/or similar time.

In some examples, determined probability distributions 52 for the positions of the autonomous vehicle 12 and the at least one other autonomous vehicle 24 can be analyzed, and/or checked, and/or compared to determine if there is at least one time where the autonomous vehicles 12, 24 will attempt to cross the same waypoint at the same and/or similar time.

In examples, at each future timestep it is checked whether the distance between the autonomous vehicle 12 and the at least one other autonomous vehicle 24 is less than the sum of their radiuses. For example, if this condition holds true, it indicates a future collision.

In examples, determining if a collision between the autonomous vehicle 12 and at least one of the at least one other autonomous vehicle 24 will occur comprises determining a probability that a collision will occur.

Determining a probability that a collision will occur can be performed in any suitable way using any suitable method.

In examples, determining a probability that a collision will occur comprises processing/using the probability of an autonomous vehicle 12 to be at a location/waypoint and the probability of an other autonomous vehicle 24 to be at a location/waypoint.

In examples, the probability that a collision will occur can be determined by the product of the probability of an autonomous vehicle 12 to be at waypoint x at time t and other autonomous vehicle 24 to be at waypoint y at time t, where the distance between waypoint x and waypoint y is less than the sum of the radiuses of the autonomous vehicles 12, 24.

In examples, determining if a collision between the autonomous vehicle 12 and at least one of the at least one other autonomous vehicle 24 will occur comprises determining if the determined probability that a collision will occur is above a value.

Any suitable value can be used, for example the value can be any suitable value above zero. Accordingly, in some examples, the value can be set at zero, that is it is determined that a collision will occur if the determined probability is above zero.

Figure 5:
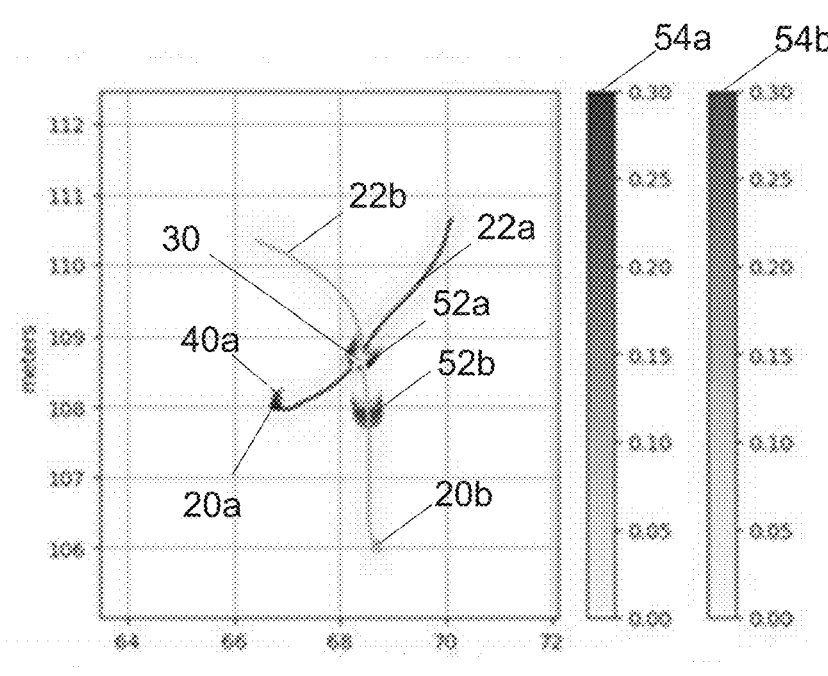
FIG. 5 shows an example scenario.

By way of example, reference is made to the example of FIG. 5.

FIG. 5 illustrates an example scenario. In the example of FIG. 5 an example of determining if a collision between an autonomous vehicle 12 and at least one other autonomous vehicle 24 is shown.

In the illustrated example, advertised position 20a and current trajectory 22a of the autonomous vehicle 12 is shown.

In addition, advertised position 20b and current trajectory 22b of the at least one other autonomous vehicle 24 is shown.

Advertised information can be considered the information transmitted/broadcast by the autonomous vehicles.

The actual, true position 40a of the autonomous vehicle 12 is also indicated in the example of FIG. 5.

Also shown in the example of FIG. 5 are probability distributions 52a, 52b, for the positions of the autonomous vehicle 12 and at least one other autonomous vehicle 24 along their trajectories after a time.

In the illustrated example, the probability distributions 52 indicate the probability of the position of the autonomous vehicle 12 and at least one other autonomous vehicle 24 along their respective trajectories 22a, b, after four timesteps of one second.

The probability scales 54a, 54b, for the illustrated probability distributions 52a, 52a are shown to the right of FIG. 5.

In the example of FIG. 5, it is determined that, after four timesteps of one second, a collision will occur between the autonomous vehicle 12 and at least one other autonomous vehicle 24 with a high likelihood.

The predicted collision zone 30 is indicated in the example of FIG. 5. The predicted collision zone 30 can be considered the position and/or area in which it is determined that the collision will/is likely to occur.

Returning to the example of FIG. 3, at block 306, method 300 comprises if it is determined that a collision will occur, amending a costmap 26 of the autonomous vehicle 12 based, at least in part, on relative positioning and/or trajectories of the autonomous vehicle 12 and that at least one of the at least one other autonomous vehicle 24 to manipulate cost in the costmap 26 in and/or around an area of a predicted collision zone 30.

Consequently, FIG. 3 illustrates a method 300 comprising:

receiving, at an autonomous vehicle 12, information 16 at least indicative of at least a velocity 18, a position 20, and at least a portion of a current trajectory 22 of at least one other autonomous vehicle 24;

determining if a collision between the autonomous vehicle 12 and at least one of the at least one other autonomous vehicle 24 will occur, based, at least in part, on the received information 16 at least indicative of at least a velocity 18, a position 20, and at least a portion of a current trajectory 22 of at least one other autonomous vehicle 24 and, at least, a velocity 19, a position 21, and at least a portion of a current trajectory 23 of the autonomous vehicle 12; and if it is determined that a collision will occur, amending a costmap 26 of the autonomous vehicle 12 based, at least in part, on relative positioning and/or trajectories of the autonomous vehicle 12 and the at least one of the at least one other autonomous vehicle 24 to manipulate cost in the costmap 26 in and/or around an area of a predicted collision zone 30.

Block 306 can be performed in any suitable way using any suitable method.

In examples, block 306 can comprise if it is determined that a collision will occur, amending a costmap 26 of the autonomous vehicle 12 based, at least in part, on relative positioning and/or trajectories of the autonomous vehicle 12 and the at least one of the at least one other autonomous vehicle 24 to manipulate cost in the costmap 26 in and/or around an area of a predicted collision zone 30 to avoid, and/or prevent, and/or avert, if possible, the determined collision.

In examples, block 306 can comprise if it is determined that a collision will occur, amending a costmap 26 of the autonomous vehicle 12 based, at least in part, on relative positioning and/or trajectories of the autonomous vehicle 12 and the at least one of the at least one other autonomous vehicle 24 to manipulate cost in the costmap 26 in and/or around an area of a predicted collision zone 30 to cause the autonomous vehicle 12 to alter and/or amend its current trajectory 22, if possible, to avoid, and/or prevent, and/or avert the determined collision.

In examples, a costmap 26 can be considered a two-dimensional occupancy grid where each cell has an associated value representing the cost of traversing the cell. In examples, the cell values can be in the range 1 to 100.

In some examples, unoccupied cells are assigned low-cost values whereas cells that are occupied are assigned high-cost values to prevent autonomous vehicles 12 from traversing occupied cells.

Amending a costmap 26 can be considered changing, and/or altering, and/or updating, and/or modifying a costmap 26.

Relative positioning and/or trajectories of the autonomous vehicle 12 and the at least one of the at least one other autonomous vehicle 24 can comprise the relative positioning and/or trajectories before, during and/or after the determined collision.

Relative positioning of the autonomous vehicle 12 and the at least one of the at least one other autonomous vehicle 24 can comprise the positions of the autonomous vehicles 12, 24 relative to one another.

In examples, the relative positioning of the autonomous vehicle 12 and at least one of the at least one other autonomous vehicle 24 can be determined based, at least in part, on the advertised/determined positions and/or the predicted positions.

For example, the relative positioning of the autonomous vehicle 12 and at least one of the at least one other autonomous vehicle 24 can be determined based, at least in part, on the positions 18 of the autonomous vehicles 12, 24 determined based, at least in part, on sensor information 34.

For example, the relative positioning of the autonomous vehicle 12 and at least one of the at least one other autonomous vehicle 24 can be determined based, at least in part, on the predicted positions determined at block 304.

Relative trajectories of the autonomous vehicle 12 and the at least one of the at least one other autonomous vehicle 24 can comprise the relative locations and/or directions of the advertised respective trajectories relative to one another.

In some examples, amending the costmap 26 of the autonomous vehicle 12 is based, at least in part, on the velocity 18, 19 of the autonomous vehicles 12, 24. For example, amending the costmap 26 of the autonomous vehicle 12 can be based, at least in part, on the relative velocity of the autonomous vehicle 12 and at least one other autonomous vehicle 24.

The costmap 26 can be amended in any suitable way to manipulate cost in and/or around an area of a predicted collision zone 30.

For example, the costmap 26 can be amended in any suitable way to manipulate cost in and/or around an area of a predicted collision zone 30 to cause the autonomous vehicle 12 to alter and/or amend its current trajectory 22, if possible, to avoid, and/or prevent, and/or avert the determined collision.

Manipulating cost in the costmap 26 can be performed in any suitable way using any suitable method.

In examples, manipulating cost in the costmap 26 can comprise at least one of: increasing cost in the costmap 26, inflating cost in the costmap 26, raising cost in the costmap 26 in and/or around an area of a predicted collision zone 30.

Manipulating a costmap 26 can comprise interacting with and/or using an API.

An area of a predicted collision zone 30 can comprise any suitable area in and/or around a predicted collision zone 30.

In examples, the area of a predicted collision zone 30 comprises the area in which it is determined that the collision will and/or is likely to happen.

In examples, the area of a predicted collision zone 30 the area in which it is determined that the likelihood of a collision is above a value, for example above zero.

In some examples, the collision-zone is determined as the set of waypoints/locations along the trajectory of the autonomous vehicle 12 where a collision is likely to happen, for example the likelihood is above zero.

The size of the set can be set to one, which means the collision-zone is the first waypoint along the trajectory of the autonomous vehicle 12 where a collision is likely to happen. Here 'first' waypoint refers to the waypoint that is the closest to the autonomous vehicle's current position.

In some examples, manipulating cost in the costmap 26 comprises manipulating at least one value in at least one cell comprising at least part of the area of the predicted collision zone 30.

In examples, amending a costmap 26 of the autonomous vehicle 12 comprises amending a costmap 26 of the autonomous vehicle 12 based, at least in part, on relative positioning and/or trajectories and/or velocity of the autonomous vehicle 12 and the at least one of the at least one other autonomous vehicle 24 to cause the autonomous vehicle 12 to avoid the determined collision, if possible, without introducing a further predicted collision.

In examples, amending a costmap 26 of the autonomous vehicle 12 comprises amending a costmap 26 of the autonomous vehicle 12 based, at least in part, on relative positioning and/or trajectories and/or velocity of the autonomous vehicle 12 and the at least one of the at least one other autonomous vehicle 24 to cause the autonomous vehicle 12 to avoid the determined collision, if possible, without causing another predicted collision between the autonomous vehicle 12 and the at least one of the at least one other autonomous vehicle 24.

In examples, amending a costmap 26 of the autonomous vehicle 12 comprises amending a costmap 26 of the autonomous vehicle 12 based, at least in part, on relative positioning and/or trajectories and/or velocity of the autonomous vehicle 12 and the at least one of the at least one other autonomous vehicle 24 to cause the autonomous vehicle 12 to avoid the determined collision in a predetermined way.

In some examples, amending a costmap 26 of the autonomous vehicle 12 comprises amending a costmap 26 of the autonomous vehicle 12 based, at least in part, on relative positioning and/or trajectories and/or velocity of the autonomous vehicle 12 and the at least one of the at least one other autonomous vehicle 24 to cause the autonomous vehicle 12 to travel towards a predetermined side 32 of a determined collision zone 30.

Accordingly, in examples, the costmaps 26 of different autonomous vehicles 12, 24 involved in a determined collision can be amended differently due to the different relative positioning and/or trajectories and/or velocity of the autonomous vehicles 12, 24.

In examples, the conflict zone 30 in each autonomous vehicle's costmap 26 is manipulated to yield conflict and oscillation-free replanning strategies.

Figure 6:
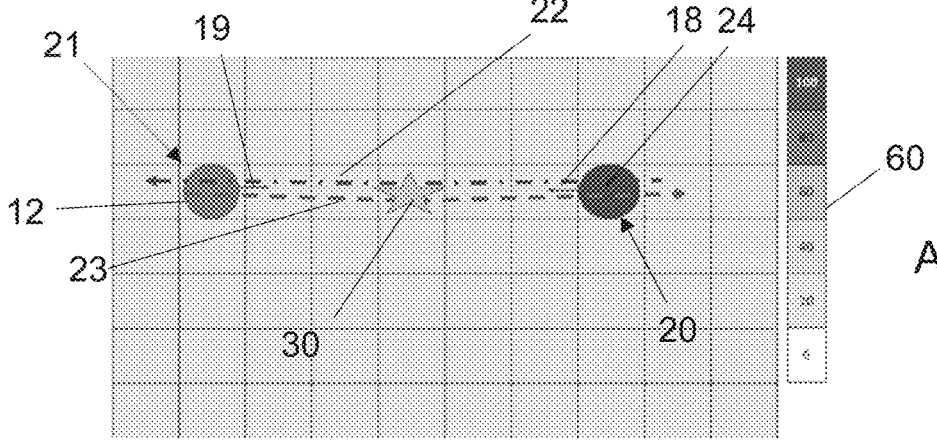
FIG. 6 shows examples of amendment of a costmap.
Figure 6:
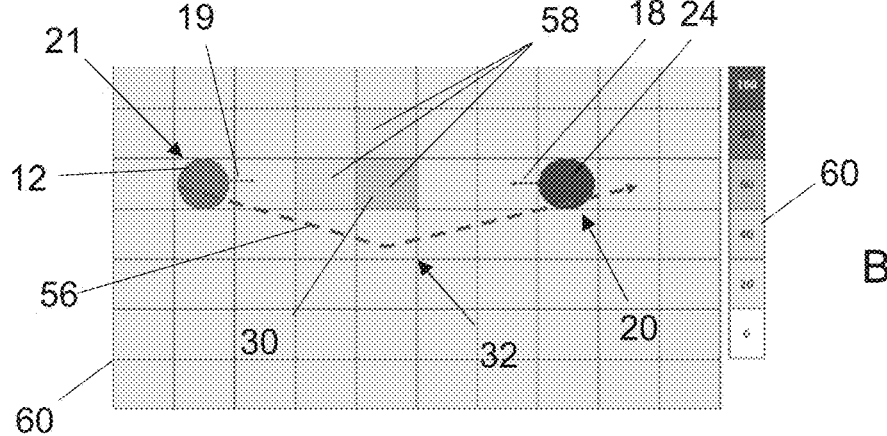
Figure 6:
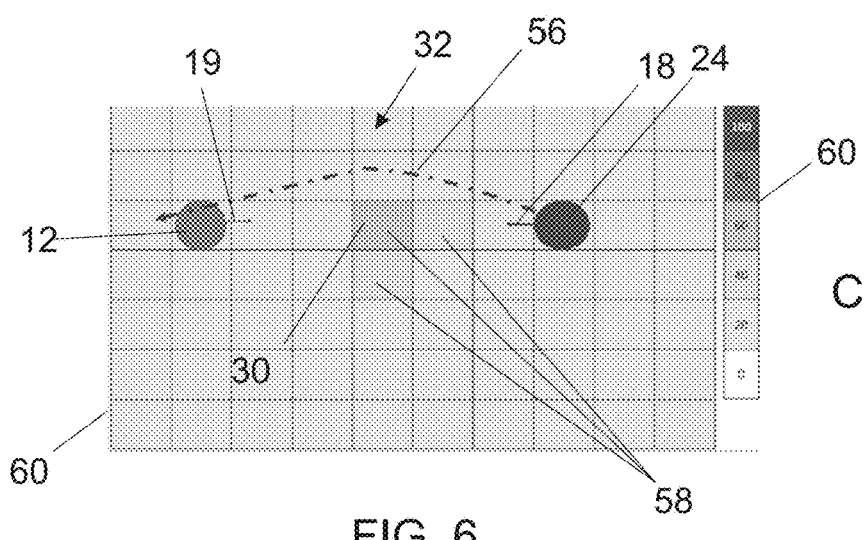

By way of example, reference is made to the example of FIG. 6.

FIG. 6 shows examples of amendment of a costmap 26 of an autonomous vehicle 12.

In part A of FIG. 6, an example of a costmap 26 of an autonomous vehicle 12 and other autonomous vehicle 24 is shown. In part A of FIG. 6 the costmaps 26 for the autonomous vehicles 12, 24 are the same.

Each cell of the costmap 26 has an associated value or cost. The scale 60 of the costmap 26 is also shown to the right of the costmap 26.

In part A of FIG. 6, the cost associated with all cells is the same.

Also illustrated in part A of FIG. 6 are an autonomous vehicle 12 and other autonomous vehicle 24. The autonomous vehicles 12, 24 are configured to perform method 300 and the advertised position 18, 19 velocity 20, 21 and current trajectory 22, 23 of the autonomous vehicles 12, 24 are indicated.

As can be seen in part A of the example of FIG. 6, the autonomous vehicles 12, 24 are heading straight towards each other, and the autonomous vehicles 12, 24 have determined that a collision will occur at a predicted collision zone 30.

Part B of FIG. 6 is similar to part A, but shows an amended costmap 26 of the autonomous vehicle 12.

In part B of FIG. 6, the costmap 26 of the autonomous vehicle 12 has been amended and cost in three cells 58 in and around the area of the predicted collision zone 30 has been manipulated. In particular, cost in the three cells 58 has been increased.

As can be seen in the example of part B of FIG. 6, the cost in cell where the collision is predicted to occur has been increased. However, the cost in cells towards and to the left of the cell in where the collision has been predicted to occur has also been increased.

The costs have therefore been increased towards the left-hand side of the collision zone 30.

This causes the autonomous vehicle 12 to replan its trajectory to avoid the collision zone 30 to the right of the collision zone 30. The costmap 26 has therefore been updated to cause the autonomous vehicle to travel towards a predetermined side 32 of the determined collision zone 30.

The updated trajectory 56 of the autonomous vehicle 12 is indicated in part B of FIG. 6.

Part C of FIG. 6 is similar to part B of FIG. 6, but shows the amended costmap 26 of the other autonomous vehicle 24.

In the amended costmap 26 of the other autonomous vehicle 24 cell values 58 have been increased towards the right-hand side of the collision zone 30, causing the other autonomous vehicle 24 to replan towards the left of the determined collision zone 30.

Accordingly, the determined collision is avoided without causing a further collision between the autonomous vehicles 12, 24.

Furthermore, the autonomous vehicles 12, 24 are moved away from each other before getting too close to the determined collision zone 30 to create a safe distance between the autonomous vehicles 12, 24.

Accordingly, this allows the collision to be avoided without needing access to and/or without tampering with a navigation stack 62 of the autonomous robots 12, 24.

From the point of view of the other autonomous vehicle 24, the other autonomous vehicle 24 would be the autonomous vehicle 12 (and the autonomous vehicle 12 would be the other autonomous vehicle 24). However, the reference numerals have been maintained through parts A, B and C for the purpose of clarity.

In examples, once a conflict is predicted, the autonomous vehicles 12, 24 are alerted of the anticipated collision point without tampering with their navigation stack.

In examples, to achieve this, the costmaps 26 of the autonomous vehicles 12, 24 are manipulated, via, for example, an exposed API.

In examples, the collision zone 30 is drawn in the costmap 26 by increasing the value of the cells 58 where the collision 30 is likely to happen.

Upon receiving the costmap updates, the autonomous vehicle's internal navigation stack 62 will replan to find the new lowest cost trajectory towards the robot's goal.

Drawing the collision-zone similarly in the costmap 26 of each autonomous vehicle that is part of the future collision might yield to autonomous vehicles replanning around the collision only to find themselves in yet another collision; or what is commonly known as the 'reciprocal dance'.

In examples, this is avoided by drawing the collision zone 30 in a way that invokes autonomous vehicles to choose the different sides to pass each other.

In examples, to achieve this, it is evaluated whether the autonomous vehicle 12 is to the left or right of the other autonomous vehicle's position and/or trajectory:

If the autonomous vehicle's position and/or trajectory is to the right of the other autonomous vehicle's position and/or trajectory, then the collision-zone 30 is drawn to inflate the cost towards the left-hand side of the collision-point to encourage the autonomous vehicle 12 to keep right by replanning to the right of the collision-point.

If the autonomous vehicle's position and/or trajectory is to the left of the other autonomous vehicle's position and/or trajectory, the collision-zone 30 is drawn to inflate the cost towards the right-hand side to encourage the autonomous vehicle to keep left by replanning towards the left-hand side of the collision.

Returning to the example of FIG. 3, in examples, if it is determined that no collision will occur, no amendment of the costmap 26 of the autonomous vehicle 12 is performed.

In some examples, method 300 comprises determining that a collision between the autonomous vehicle 12 and the at least one of the at least one other autonomous vehicle 24 will occur despite amending the costmap 26 of the autonomous vehicle 12; and controlling movement of the autonomous vehicle 12 to avoid the collision based, at least in part, on a predetermined priority order for the autonomous vehicle 12 and the at least one other autonomous vehicle 24.

Determining that a collision between the autonomous vehicle 12 and the at least one of the at least one other autonomous vehicle 24 will occur despite amending the costmap 26 can be performed in any suitable way using any suitable method.

In examples, determining that the collision cannot be avoided comprises determining that no alternative trajectory can be determined.

In examples, determining that the collision cannot be avoided comprises determining that the autonomous vehicle 12 has reached a proximity threshold to the determined conflict zone 30.

Any suitable proximity threshold can be used. For example, any suitable proximity threshold equal to or greater than the sum of the radiuses of the autonomous vehicles 12, 24 can be used.

In examples, to account for, for example, communication and/or computation delays and/or sensor noise, a safety margin 's' can be added to the proximity threshold such that the proximity threshold $>=$radius_12+radius_24+s.

Accordingly, increasing the value of 's' increases the proximity threshold. In examples, 's' can be considered a margin that factors in uncertainty of localization, message propagation time, and/or travel-time estimation.

In examples, determining that the collision cannot be avoided comprises determining that the autonomous vehicle 12 has reached a proximity threshold to at least one other autonomous vehicle 24.

In examples, at least one identifier of the autonomous vehicle 12 can be transmitted, for example with information 16, to allow the autonomous vehicles 12 to determine the priority order when collisions cannot be avoided using costmap manipulation.

Controlling movement of the autonomous vehicle 12 to avoid the collision based, at least in part, on a predetermined priority order for the autonomous vehicle 12 and the at least one other autonomous vehicle 24 can be performed in any suitable way using any suitable method.

In examples, controlling movement of the autonomous vehicle 12 to avoid the collision based, at least in part, on a predetermined priority order for the autonomous vehicle 12 and the at least one other autonomous vehicle 24 comprises controlling speed of the autonomous vehicle 12.

In examples, controlling movement of the autonomous vehicle 12 to avoid the collision based, at least in part, on a predetermined priority order for the autonomous vehicle 12 and the at least one other autonomous vehicle 24 comprises operating at least one braking mechanism of the autonomous vehicle 12.

In examples, controlling movement of the autonomous vehicle 12 to avoid the collision based, at least in part, on a predetermined priority order for the autonomous vehicle 12 and the at least one other autonomous vehicle 24 comprises operating a handbrake of the autonomous vehicle 12.

In some examples, controlling movement of the autonomous vehicle 12 to avoid the collision based, at least in part, on a predetermined priority order for the autonomous vehicle 12 and the at least one other autonomous vehicle 24 comprises stopping the autonomous vehicle 12. For example, controlling movement of the autonomous vehicle 12 to avoid the collision can comprise operating at least one braking mechanism of the autonomous vehicle 12, such as a handbrake of the autonomous vehicle 12, to stop the autonomous vehicle 12.

Accordingly, in some examples, the autonomous vehicle 12 will stop and yield to the at least one other autonomous vehicle 24 to avoid the collision, when the at least one other autonomous vehicle 24 has a higher priority than the autonomous vehicle 12.

Figure 7:
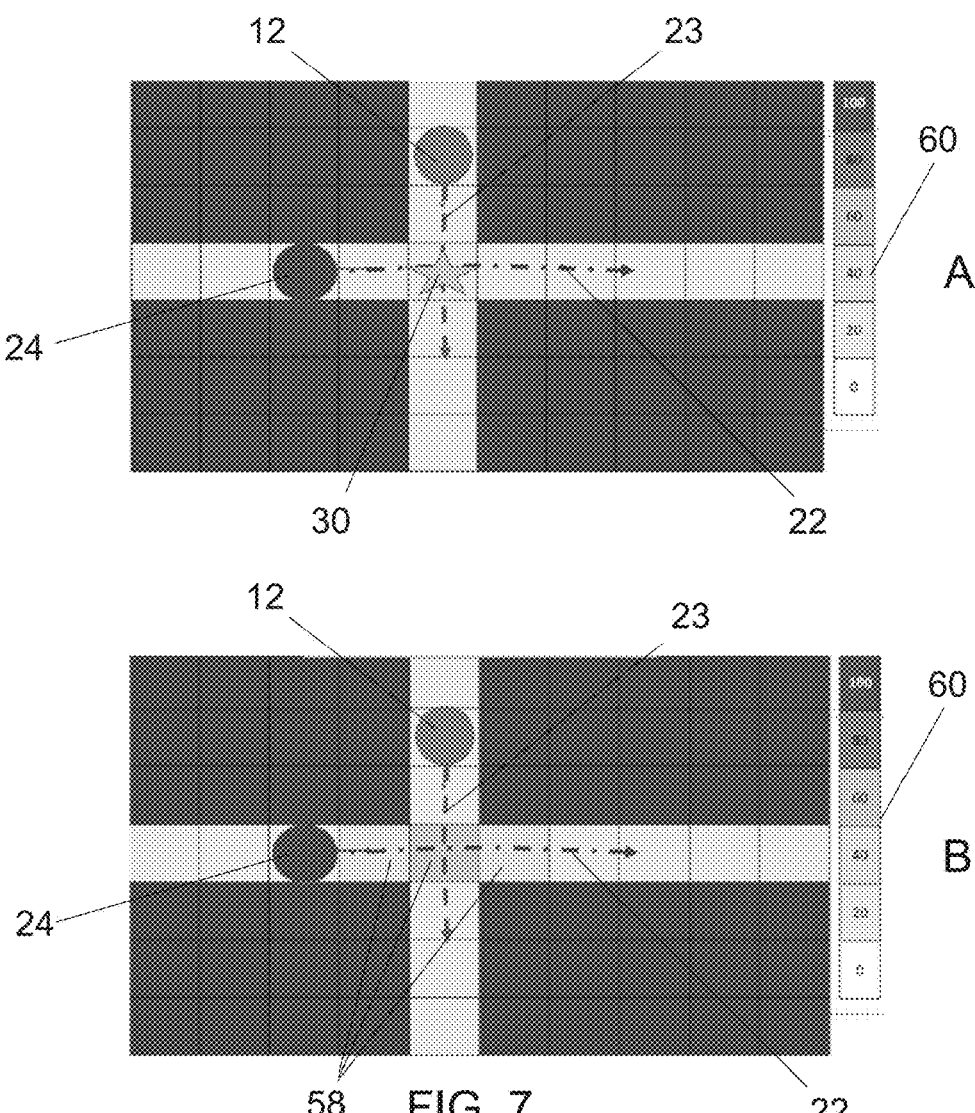
FIG. 7 shows an example scenario.

By way of example, reference is made to FIG. 7.

FIG. 7 illustrates an example where manipulation of a costmap 26 will not avoid a determined collision.

Part A of FIG. 7 is similar to part A of FIG. 6. However, in the example of FIG. 7 two autonomous vehicles 12, 24 approach an intersection.

The autonomous vehicles 12, 24 have determined that a collision will occur at the intersection and the costmaps 26 of the autonomous vehicles have been amended accordingly. The amended costmap 26 of the autonomous vehicle 12 is shown in part B of FIG. 7.

However, due to the nature of the intersection, the collision will still occur despite amendment of the costmap 26, as no alternative trajectories are available.

In the example, of FIG. 7, the autonomous vehicle 12 has priority and therefore the other autonomous vehicle 24 operates its handbrake to allow the autonomous vehicle 12 to pass through the collision zone first, thus avoiding the collision.

Accordingly, while some scenarios can be resolved with costmap manipulation, others can only be resolved by having one robot yield the right of way to the other robots. This is akin to two people trying to enter a room at the same time, or meeting at a crossroad.

In examples, handbrake manipulation is designed to address these scenarios.

In some examples, after autonomous vehicles 12 detect a conflict and reflect the conflict in their costmap 26 using costmap manipulation as described herein, the autonomous vehicle's internal navigation stack 62 might fail to find an alternative path.

In examples, in addition to manipulating the costmap 26, the autonomous vehicles 12 perform a local election, based, at least in part on the priority order of the autonomous vehicles 12 for example using pre-learned or advertised identifiers, to determine the leader and the follower in a conflict. The follower starts an event to pull the handbrake when it is close to the conflict zone. A user-specified threshold value can determine how close the follower can get to the conflict zone.

Once the follower reaches the threshold, it indicates that the leader and follower failed to find an alternative path, and subsequently, the follower pulls the handbrake yielding the right of way to the leader.

Returning to the example of FIG. 3, in examples block 306 is not performed and therefore costmap manipulation is not performed. Instead, in examples, determined collisions are avoided using a predetermined priority order for the autonomous vehicles.

Accordingly, in examples, determined collisions are avoided by controlling movement of the autonomous vehicle 12 to avoid the collision based, at least in part, on a predetermined priority order for the autonomous vehicle 12 and the at least one other autonomous vehicle 24 as described above.

Controlling movement of the autonomous vehicle 12 be as described herein. For example, controlling movement of the autonomous vehicle 12 can comprise operating at least one braking mechanism of the autonomous vehicle 12, such as a handbrake of the autonomous vehicle 12, to stop the autonomous vehicle 12.

Consequently, in some examples FIG. 3 illustrates a method 300 comprising:

receiving, at an autonomous vehicle 12, information 16 at least indicative of at least a velocity 18, a position 20, and at least a portion of a current trajectory 22 of at least one other autonomous vehicle 24;

determining if a collision between the autonomous vehicle 12 and at least one of the at least one other autonomous vehicle 24 will occur, based, at least in part, on the received information 16 at least indicative of at least a velocity 18, a position 20, and at least a portion of a current trajectory 22 of at least one other autonomous vehicle 24 and, at least, a velocity 19, a position 21, and at least a portion of a current trajectory 23 of the autonomous vehicle 12; and if it is determined that a collision will occur, controlling movement of the autonomous vehicle 12 to avoid the collision based, at least in part, on a predetermined priority order for the autonomous vehicle 12 and the at least one other autonomous vehicle 24.

Figure 8:
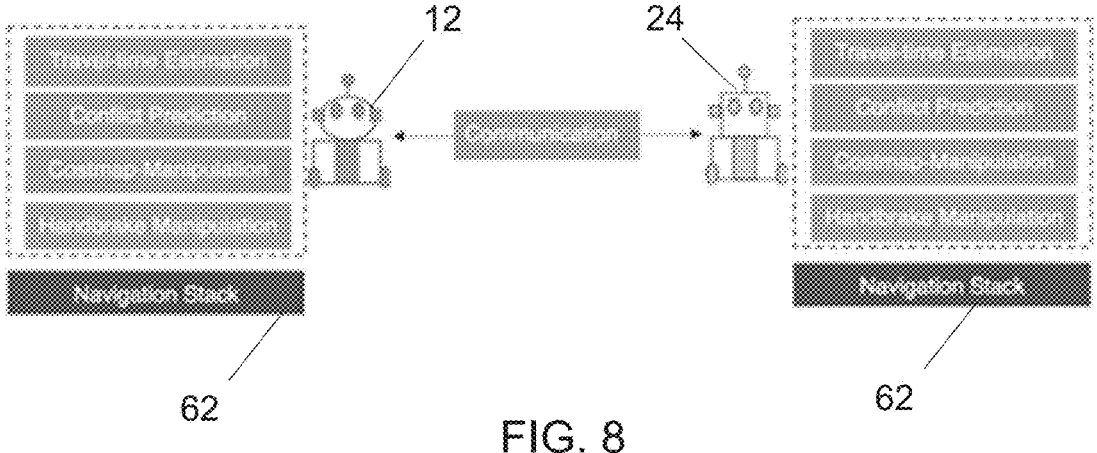
FIG. 8 shows an example overview.

FIG. 8 illustrates an example overview of examples of the disclosure.

FIG. 8 schematically illustrates an autonomous vehicle 12 and at least one other autonomous vehicle 24.

The autonomous vehicle 12 and at least one other autonomous vehicle 24 are configured to perform one or more methods described herein. For example, the autonomous vehicle 12 and at least one other autonomous vehicle 24 can be configured to perform method 300.

As illustrated in the example of FIG. 8 the functionality described herein can sit on top of a navigation stack 62 and operate without altering and/or tampering with the navigation stack 62.

Examples of the disclosure are advantageous and/or provide technical benefits.

For example, examples of the disclosure enable autonomous vehicles to anticipate and avoid collisions without causing further collisions.

For example, examples of the disclosure enable collision avoidance in autonomous vehicles without affecting and/or altering a navigation stack of the autonomous vehicle. Examples of the disclosure are therefore agnostic to the navigation stack/planner of the autonomous vehicle.

FIG. 9 illustrates an example of a controller 930 suitable for use in an apparatus, such as apparatus 10 of FIG. 1 and/or FIG. 2. In examples, controller 930 can be considered an apparatus 10.

Implementation of a controller 930 may be as controller circuitry. The controller 930 may be implemented in hardware alone, have certain aspects in software including firmware alone or can be a combination of hardware and software (including firmware).

As illustrated in FIG. 9A the controller 930 may be implemented using instructions that enable hardware functionality, for example, by using executable instructions of a computer program 936 in a general-purpose or special-purpose processor 932 that may be stored on a computer readable storage medium (disk, memory etc.) to be executed by such a processor 932.

The processor 932 is configured to read from and write to the memory 934. The processor 932 may also comprise an output interface via which data and/or commands are output by the processor 932 and an input interface via which data and/or commands are input to the processor 932.

The memory 934 stores a computer program 936 comprising computer program instructions (computer program code) that controls the operation of the apparatus when loaded into the processor 932. The computer program instructions, of the computer program 936, provide the logic and routines that enables the apparatus to perform the methods illustrated in the accompanying FIGS. The processor 932 by reading the memory 934 is able to load and execute the computer program 936.

The apparatus comprises:

at least one processor 932; and at least one memory 934 including computer program code the at least one memory 934 and the computer program code configured to, with the at least one processor 932, cause the apparatus at least to perform:

receiving, at an autonomous vehicle, information at least indicative of at least a velocity, a position and at least a portion of a current trajectory of at least one other autonomous vehicle;

determining if a collision between the autonomous vehicle and at least one of the at least one other autonomous vehicle will occur, based, at least in part, on the received information at least indicative of at least a velocity, a position, and at least a portion of a current trajectory of at least one other autonomous vehicle and, at least, a velocity, a position and at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to manipulate cost in the costmap in and/or around an area of a predicted collision zone.

The apparatus comprises:

at least one processor 932; and at least one memory 934 including computer program code, the at least one memory storing instructions that, when executed by the at least one processor 932, cause the apparatus at least to:

receiving, at an autonomous vehicle, information at least indicative of at least a velocity, a position and at least a portion of a current trajectory of at least one other autonomous vehicle;

determining if a collision between the autonomous vehicle and at least one of the at least one other autonomous vehicle will occur, based, at least in part, on the received information at least indicative of at least a velocity, a position, and at least a portion of a current trajectory of at least one other autonomous vehicle and, at least, a velocity, a position and at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to manipulate cost in the costmap in and/or around an area of a predicted collision zone.

As illustrated in FIG. 9A, the computer program 936 may arrive at the apparatus via any suitable delivery mechanism 962. The delivery mechanism 962 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 936. The delivery mechanism may be a signal configured to reliably transfer the computer program 936. The apparatus may propagate or transmit the computer program 936 as a computer data signal.

A computer program comprising instructions which, when executed by an apparatus, cause the apparatus to perform at least the following:

receiving, at an autonomous vehicle, information at least indicative of at least a velocity, a position and at least a portion of a current trajectory of at least one other autonomous vehicle;

determining if a collision between the autonomous vehicle and at least one of the at least one other autonomous vehicle will occur, based, at least in part, on the received information and a velocity, a position and, at least, at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to inflate cost in the costmap in and/or around an area of a predicted collision zone.

The computer program instructions may be comprised in a computer program, a non-transitory computer readable medium, a computer program product, a machine readable medium. In some but not necessarily all examples, the computer program instructions may be distributed over more than one computer program.

Although the memory 934 is illustrated as a single component/circuitry it may be implemented as one or more separate components/circuitry some or all of which may be integrated/removable and/or may provide permanent/semi-permanent/dynamic/cached storage.

In examples the memory 934 comprises a random-access memory 958 and a read only memory 960. In examples the computer program 936 can be stored in the read only memory 958. See, for example, FIG. 9B.

In examples the memory 934 can be split into random access memory 958 and read only memory 960.

Although the processor 932 is illustrated as a single component/circuitry it may be implemented as one or more separate components/circuitry some or all of which may be integrated/removable. The processor 932 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory or memories that work together to cause an apparatus, such as a mobile phone or server, to perform various functions and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the accompanying FIGS. may represent steps in a method and/or sections of code in the computer program 936. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus can comprise means for:

receiving, at an autonomous vehicle, information at least indicative of at least a velocity, a position, and at least a portion of a current trajectory of at least one other autonomous vehicle;

determining if a collision between the autonomous vehicle and at least one of the at least one other autonomous vehicle will occur, based, at least in part, on the received information at least indicative of at least a velocity, a position, and at least a portion of a current trajectory of at least one other autonomous vehicle and, at least, a velocity, a position and at least a portion of a current trajectory of the autonomous vehicle; and if it is determined that a collision will occur, amending a costmap of the autonomous vehicle based, at least in part, on relative positioning and/or trajectories of the autonomous vehicle and the at least one of the at least one other autonomous vehicle to manipulate cost in the costmap in and/or around an area of a predicted collision zone.

In examples, an apparatus can comprise means for performing one or more methods, and/or at least part of one or more methods, as disclosed herein.

In examples, an apparatus can be configured to perform one or more methods, and/or at least part of one or more methods, as disclosed herein.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory storing instructions that, when executed by the at least one processor, cause the apparatus at least to:

receive, at an autonomous vehicle from at least one other autonomous vehicle, a message comprising first information that indicates at least a velocity, a position, and at least a portion of a current trajectory of the at least one other autonomous vehicle;

determine whether a collision between the autonomous vehicle and at least one of the at least one other autonomous vehicle will occur, based at least in part on the first information and second information that indicates at least a velocity, a position, and at least a portion of a current trajectory of the autonomous vehicle; and responsive to determining that the collision will occur, amend a costmap of the autonomous vehicle based, at least in part, on (i) a relative position of the autonomous vehicle or a trajectory of the autonomous vehicle and (ii) a relative position of the at least one other autonomous vehicle or a trajectory of the at least one other autonomous vehicle to manipulate cost in the costmap around an area of a predicted collision zone.

2. An apparatus as claimed in claim 1, wherein the amending of the costmap of the autonomous vehicle further comprises; amending the costmap of the autonomous vehicle to cause the autonomous vehicle to travel towards a predetermined side of the predicted collision zone.

3. An apparatus as claimed in claim 1, wherein the apparatus is further caused to determine second information based at least in part on sensor information from one or more sensors of the autonomous vehicle.

4. An apparatus as claimed in claim 1, wherein the apparatus is further caused to control transmission of the first information.

5. An apparatus as claimed in claim 1, wherein determining whether the collision between the autonomous vehicle and at least one of the at least one other autonomous vehicle will occur further comprises; determine a probability distribution for the position of the at least one other autonomous vehicle along the current trajectory of the at least one other autonomous vehicle as a function of time.

6. An apparatus as claimed in claim 1, wherein determining whether the collision between the autonomous vehicle and at least one of the at least one other autonomous vehicle will occur further comprises; determine a probability distribution for the position of the autonomous vehicle along the current trajectory of the autonomous vehicle as a function of time.

7. An apparatus as claimed in claim 5, wherein the determining the probability distribution further comprises; use a trained Markov-model.

8. An apparatus as claimed in claim 1, wherein the apparatus is further caused to:

determine that the collision between the autonomous vehicle and the at least one of the at least one other autonomous vehicle will occur despite amending the costmap of the autonomous vehicle; and control movement of the autonomous vehicle to avoid the collision based, at least in part, on a predetermined priority order for the autonomous vehicle and the at least one of the at least one other autonomous vehicle.

9. An apparatus as claimed in claim 1, wherein the message comprises a low-bandwidth message.

10. A method comprising:

receiving, at an autonomous vehicle from at least one other autonomous vehicle, a message comprising first information that indicates at least a velocity, a position, and at least a portion of a current trajectory of the at least one other autonomous vehicle;

determining if a collision between the autonomous vehicle and at least one of the at least one other autonomous vehicle will occur, based at least in part on the first information and second information that indicates at least a velocity, a position, and at least a portion of a current trajectory of the autonomous vehicle; and responsive to determining that the collision will occur, amending a costmap of the autonomous vehicle based, at least in part, on (i) a relative position of the autonomous vehicle or a trajectory of the autonomous vehicle and (ii) a relative position of the at least one of the at least one other autonomous vehicle or a trajectory of the at least one other autonomous vehicle to manipulate cost in the costmap around an area of a predicted collision zone.

11. A method as claimed in claim 10, wherein amending a costmap of the autonomous vehicle further comprises amending a costmap of the autonomous vehicle to cause the autonomous vehicle to travel towards a predetermined side of the predicted collision zone.

12. A method as claimed in claim 10, further comprising determining the velocity and position of the autonomous vehicle, based, at least in part, on sensor information.

13. A method as claimed in claim 10, further comprising controlling transmission of the first information.

14. A method as claimed in claim 10, wherein determining whether the collision between the autonomous vehicle and at least one of the at least one other autonomous vehicle will occur further comprises determining a probability distribution for the position of the at least one other autonomous vehicle along the current trajectory of the at least one other autonomous vehicle as a function of time.

15. A method as claimed in claim 10, wherein determining whether the collision between the autonomous vehicle and at least one of the at least one other autonomous vehicle will occur further comprises determining a probability distribution for the position of the autonomous vehicle along the current trajectory of the autonomous vehicle as a function of time.

16. An method as claimed in claim 10, further comprising:

determining that the collision between the autonomous vehicle and the at least one of the at least one other autonomous vehicle will occur despite amending the costmap of the autonomous vehicle; and controlling movement of the autonomous vehicle to avoid the collision based, at least in part, on a predetermined priority order for the autonomous vehicle and the at least one of the at least one other autonomous vehicle.

17. A non-transitory computer readable medium comprising program instructions which, when executed by an apparatus, cause the apparatus to perform at least the following:

receiving, at an autonomous vehicle from at least one other autonomous vehicle, a message comprising first information that indicates at least a velocity, a position, and at least a portion of a current trajectory of the at least one other autonomous vehicle;

determining if a collision between the autonomous vehicle and at least one of the at least one other autonomous vehicle will occur, based at least in part on the first information and second information that indicates a velocity, a position, and at least a portion of a current trajectory of the autonomous vehicle; and responsive to determining that the collision will occur, amending a costmap of the autonomous vehicle based, at least in part, on (i) a relative position of the autonomous vehicle or a trajectory of the autonomous vehicle and (ii) a relative position of the at least one of the at least one other autonomous vehicle or a trajectory of the at least one other autonomous vehicle to inflate cost in the costmap around an area of a predicted collision zone.

18. A non-transitory computer readable medium as claimed in claim 17, wherein amending the costmap of the autonomous vehicle further comprises amending the costmap of the autonomous vehicle to cause the autonomous vehicle to travel towards a predetermined side of the predicted collision zone.

19. A non-transitory computer readable medium as claimed in claim 17, further caused to determine the second information based at least in part on sensor information from one or more sensors of the autonomous vehicle.

20. A non-transitory computer readable medium as claimed in claim 17, further caused to control transmission of the first information.

* * * * *